INVENTOR.
LEE A. WOOLLEY

United States Patent Office 3,452,228
Patented June 24, 1969

3,452,228
MOTOR CONSTRUCTION
Lee A. Woolley, Kokomo, Ind., assignor, by mesne assignments, to The Scott & Tetzer Company, Lakewood, Ohio, a corporation of Ohio
Original application Oct. 15, 1962, Ser. No. 231,325, now Patent No. 3,307,056, dated Feb. 28, 1967. Divided and this application Sept. 12, 1966, Ser. No. 578,833
Int. Cl. H02k 7/116
U.S. Cl. 310—83
27 Claims

ABSTRACT OF THE DISCLOSURE

A synchronous electric motor has a motor section and a gear train section drivably connected together by a pair of complemental co-axial elements which are slidably separable from each other, a first case enclosing the motor section, a second case having a pair of separate complemental co-acting case elements which are the sole means for enclosing only the gear train, and means secured to the first case and to both of the complemental case elements for mounting the motor assembly and for holding the complemental elements together, the motor section having a soft-energy-absorbent plastic thrust member disposed between and jointly engageable by the rotor and the case, said rotor having a hub with a flange of rigid non-magnetic material having rigid means for engaging and locking pole plates against angular movement with respect to the hub, the rotor coating with the stator and each having a set of poles, one set of poles being uniformly angularly spaced about the rotational axis, and half of the poles of the other set being offset in one direction by an angle equal to one-half of a pole spacing, the stator including a bobbin having rigid spline means projecting into space between stator poles to locate them.

---

This invention relates generally to electric motors, and more specifically to a structure for a self-starting synchronous motor.

This application is a division of my copending application filed Oct. 15, 1962, now Patent No. 3,307,056, which application is a continuation-in-part of my then copending application filed Sept. 6, 1961, Ser. No. 136,362, which is now abandoned.

Although the principles of the present invention may be included in various devices, a particularly useful application is made in a synchronous motor of the clock type in which a self-starting permanently magnetic rotor is drivingly connected to a gear train incorporated within the structure of the device.

Although synchronous motors of the self-starting type have been used for some time, various problems have arisen in connection with their manufacture and use. Some have employed costly or strategic materials, others have required considerable labor to assemble, others have been composed of components produced by comparatively expensive manufacturing processes, some have had inadequate torque, some have been excessively large, and others have been too noisy.

The motor of this invention embodies several features which enable the manufacture of the components on mass production type of machinery, enable the assembly thereof with a minimum of labor of minimum skill, incur a minimum material cost, all the foregoing being achieved in a comparatively small size device having substantial torque, with a minimum of noise produced by operation. The foregoing advantages are particularly pertinent when the motor is employed in a sequential timer as a timer motor.

Accordingly, it is an object of the present invention to provide an improved synchronous electric motor.

A further object of the present invention is to provide a motor characterized by a simplicity of structure combined with versatility and adaptability.

A still further object of the present invention is to provide a structure for a motor which, because of its simplicity, is producible by mass production tooling.

Yet another object of the present invention is to provide a motor such as that described wherein the motor section and the gear train section are readily separable and assemblable as units, together with structural features enabling such separation and assembly.

Another object of the present invention is the provision of means for eliminating motor rotor noise.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

Figure 1:
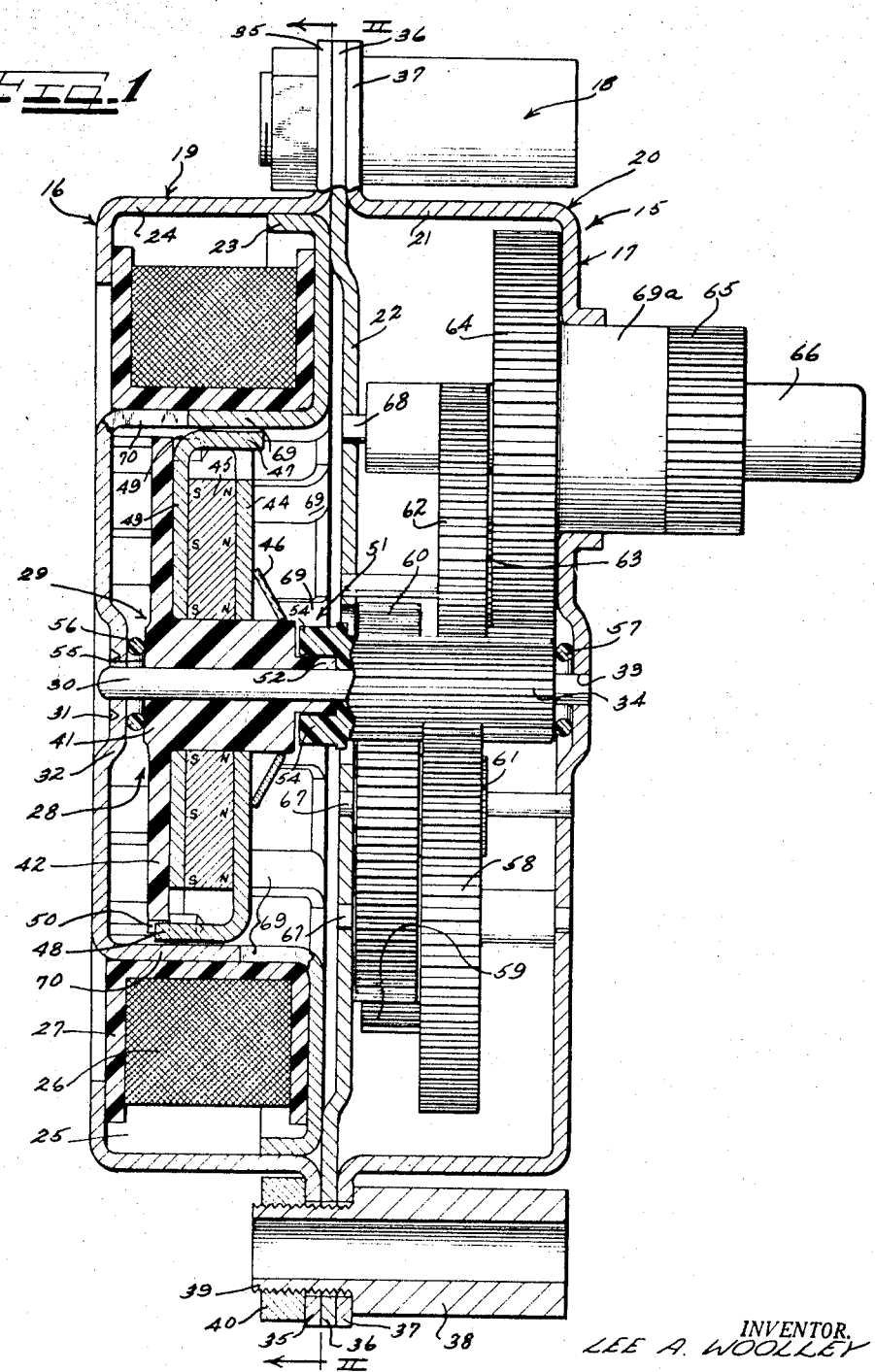
FIGURE 1 is an enlarged cross-sectional view of a motor construction provided with improved structural features in accordance with the principles of the present invention.

The principles of this invention are particularly useful when embodied in a unitized synchronous electric motor assembly such as illustrated in FIGURE 1, generally indicated by the numeral 15. Although all of the features of the invention disclosed herein can be employed to advantage in a synchronous electric motor, it is to be understood that certain features of this invention can be utilized in other motors, and that therefore the disclosure is to be considered exemplary.

The motor assembly 15 includes a motor section generally indicated at 16, a gear train section generally indicated at 17, and appropriate mounting means generally indicated at 18.

The motor assembly 15 is enclosed by case means which in this embodiment includes a first case 19 for the motor section 16, and a second case 20 for the gear train section 17. The case 20 includes a cup-shaped case element 21 and a nearly flat case element 22. The case elements 21 and 22 are complemental to each other and jointly comprise the sole case means or case for the gear train section 17, and encase only the gear train section 17. The case 20 provides support for the gear train which comprises gears and elements identified later herein, and therefore the case 20, and in particular the case element 22 may be considered as a part of the frame of the motor assembly 15.

The case 19 for the motor section 16 includes a pair of cup-like magnetic field members 23, 24 which are pressed together as explained later herein, and which enclose the electrical structure of the motor assembly 15. The magnetic field members 23 and 24 jointly define an annular recess 25 for the motor winding 26 which is carried on a rigid plastic bobbin 27, and also define a rotor cavity 28 within which there is disposed a permanently magnetic rotor assembly generally indicated at 29.

Support means in the form of a pin 30 are rigidly secured as by staking 31 to an end wall 32 of the magnetic field member 24. The support pin 30 is disposed concentrically within the rotor cavity 28 and slidably receives the rotor element 29 thereon. At the other end, the support pin 30 is slidably received into a recess or aperture 33 in the case element 21, and also supports a rotor pinion 34 slidably thereon. It is to be noted that the end wall 32 of the magnetic field member 24 is recessed around the staking 31 so that the end of the support pin 30 does not project beyond the outer plane of the field member 24. The field member 24 is provided with a pair of lugs 35, 35 which register with similar lugs 36, 37 respectively carried by the case elements 22 and 21. The mounting means 18 comprises a hollow standoff member 38 having a reduced threaded end 39 extending through the lugs 35–37 and receiving a nut 40 by which the cases 19 and 20 are secured together to comprise a single case means. The motor section 16 may be assembled as a unit and the gear train section 17 assembled as a separate unit, the sections 16 and 17 then being slidably engageable with each other for both assembly and disassembly, the sections 16, 17 being held together at the lugs 35–37 by appropriate means. This structure is particularly advantageous since other gear train sections 17 having different speed reductions may be readily initially assembled or substituted. Moreover, when the mounting means 18 are removed, there is immediate access to all of the moving parts of both sections 16 and 17.

The rotor 29 includes a hub or hub portion 41 of non-magnetic material, such as a rigid plastic, a preferred type being a polymerized formaldehyde type of resin. The hub or hub portion 41 is provided with an integral flange 42 which extends radially therefrom and which serves as a backing means for a stack of elements including a pair of magnetic pole plates 43, 44 which are spaced apart by a permanent magnet 45. The pole plates 43, 44 and the magnet 45 are arranged coaxially with the rotational axis of the rotor 29 and are held securely against the flange 42 by appropriate retaining means such as a spring clip 46. Each of the pole plates 43, 44 is provided with a set of pole elements which extend parallel to the axis of rotation and which are interfitted with each other. In this embodiment, the pole plates 43, 44 are identical to each other and are each provided with eleven pole elements, a pole element 47 shown on FIGURE 2 being typical of the pole elements of the pole plate 43, and a pole element 48 being typical of the pole elements of the pole plate 44.

Figure 2:
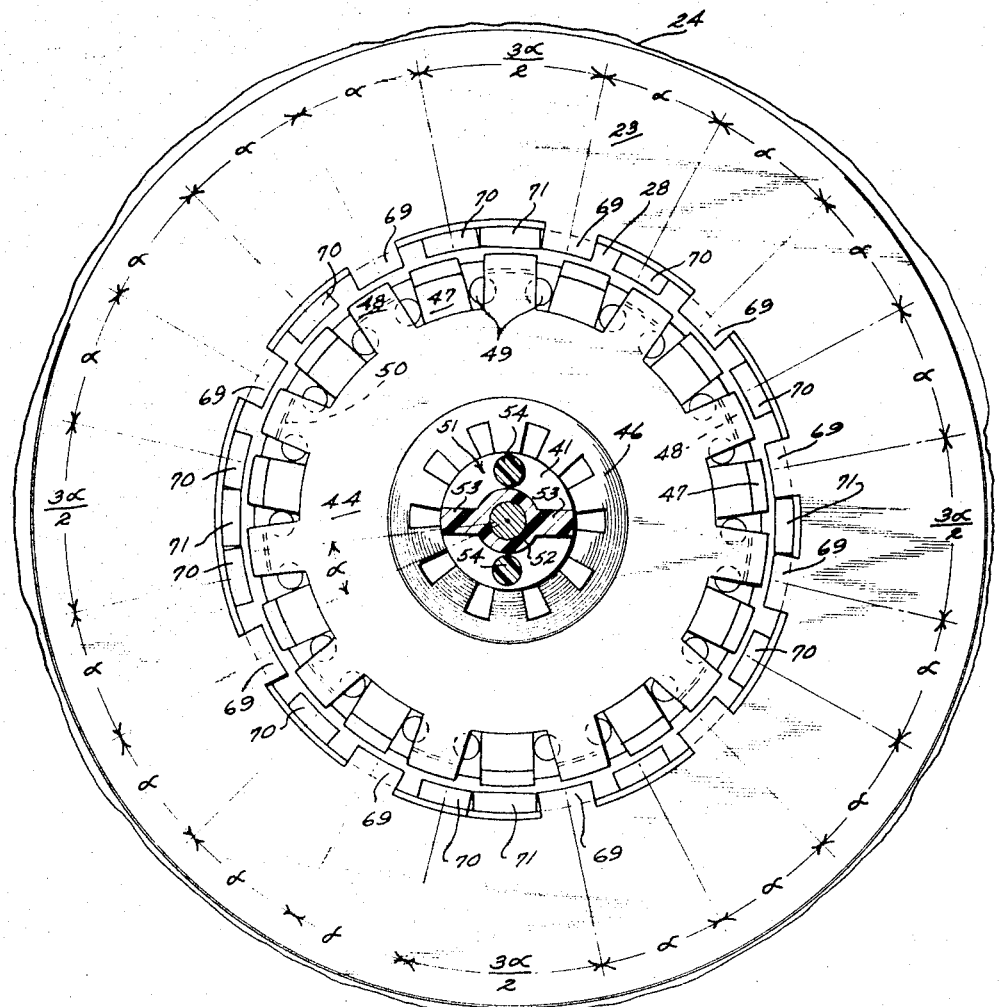
FIGURE 2 is a cross-sectional view taken along line II—II of FIGURE 1, and partially broken away.

As best seen in FIGURE 2 (which illustrates the rotor in an unstable transient position with respect to the stator), the pole elements 47 are disposed uniformly about the axis of rotation, as are also the pole elements 48. Each of the pole elements 48 is interfitted centrally within the space between two of the pole elements 47. All of the pole elements 47 and 48 are of the same size and they are uniformly distributed about the rotational axis. In this embodiment, south magnetic field polarity is induced in the pole plate 43 and hence in the pole elements 47, while north magnetic polarity is induced in the pole plate 44 and hence in the pole elements 48. Thus the poles 47 and 48 are of alternate magnetic polarity.

In this embodiment, friction maintained by the retaining means 46 will insure and maintain the uniformity of spacing of the pole elements 47 and 48. However, if desired the flange 42 may be adapted to positively maintain the proper alignment and spacing. To this end, the plastic flange 42 secured to the hub 41 may be provided with a series of integral rigid plastic finger means 49 disposed at each side of each pole element 47. The flange 42 is provided with a series of peripheral notches 50 respectively receiving the tips of the pole elements 48. Where each pole plate 43, 44 is provided with an odd number of poles, such as eleven herein, it is preferred that the locking or angular maintaining means be provided for each pair of oppositely polarized poles so that the resulting structure will be inherently balanced. Therefore, the means integral with the plastic hub flange 42 which engages and aligns either pole plate is repeated by a number of times equal to the number of pole elements in one of such plates, such means being equally spaced about the axis of rotation.

As seen in FIGURES 1 and 2, there is provided a driving connection generally indicated at 51 between an end of the hub 41 and the rotor pinion 34. The driving connection 51 comprises a slidably separable angular lost motion connection, and to this end, employs means integral with the hub 41 and the rotor pinion 34 which complement each other. Thus the means which comprises the driving connection are coaxial and rotatable about the support pin 30. In the illustrated embodiment, the driving connection 51 includes a portion 52 of reduced diameter integral with the hub 41, and from which a pair of tongue means 53, 53 extends radially. For cooperation therewith, the driving connection 51 further includes a pair of pin means 54, 54 which extend parallel to the rotational axis of the rotor pinion 34, and which are integrally secured thereto at points radially offset from the rotational axis. The spacing between the pins 54, 54 is substantially the same as the diameter of the reduced diameter portion 52. Since these elements have a common rotational axis, the pins 54, 54 can move as a unit about a portion of the periphery of the reduced diameter portion 52 for an angle which is limited by engagement between the pin means 54 and the tongue means 53.

The rotor pinion 34 preferably comprises flexible non-resilient plastic to enable deformation of the pins 54, 54, and the pinion gear teeth, and of the body of the pinion 34 between the pins 54, 54 and the point where the gear teeth are meshed therewith. An example of such material is polyurethane having a Shore Durometer "A" hardness reading of about 80. A sample having a reading of about 92 has been determined experimentally to be excessively hard. Because of this flexibility the pins 54, 54 tend to spread out, the gear teeth tend to yield and the body of the pinion 34 tends to twist.

This specific driving connection structure is particularly advantageous in that it is slidably separable in an axial direction. As explained below the instant motor section 16 is of the type which inherently is capable of starting in either direction. It is possible that the motor section 16 may attempt to start against a full load. Other motors have been known to fail to start when an attempt is made to start against a full load. To lessen the likelihood of failure to start because of the load, and to increase the mechanical energy in the rotor 29 for starts in the wrong direction, the instant driving connection 51 is particularly advantageous.

The rotor 29 and rotor pinion 34 are slidable axially on the support pin 30. There is a tendency for the rotor to vibrate axially and cause noise. Further, these elements require an appropriate low friction thrust element, so that if the motor is disposed with the support pin 30 in a non-horizontal position, there will not result an excess of friction between the case means and the rotating parts. In the instant embodiment, there is provided an appropriate noise-suppressing thrust element on opposite sides of the rotor 29. More specifically, the hub 41 has an axial end face 55 disposed in spaced confronting relation to a portion of the case means, and in this space, there is disposed a soft plastic thrust ring 56 which loosely encircles the pin 30 and hence the rotational axis. The ring 56 preferably comprises polyurethane plastic. Vinyl plastic may also be used but is less satisfactory. The plastic should be soft or "dead," i.e. non-resilient, to absorb energy. At the other side of the rotor adjacent to a remote end of the rotor pinion 34 there may be provided a second soft plastic thrust ring 57 which likewise encircles the pin 30 and hence the rotational axis. The ring 57 preferably comprises polyurethane plastic and therefore may comprise an integral extension of the polyurethane pinion 34. I have found that this combination of materials is advantageous from a performance and from a cost standpoint, while the simplicity of construction is clearly evident. Thus the "floating" thrust rings 56 and 57 or the thrust ring 56 and the corresponding end of the polyurethane pinion 34, will coact with the rotor 29 and rotor pinion 34 and the adjacent case means to damp axial rotor vibrations and to accommodate any axial thrust which may be present.

The separable rotor pinion 34 meshes with a molded plastic gear 58 which has an integral pinion 59 in mesh with a rotary gear 60. The gear 60 is likewise constructed of molded plastic and is provided with an integral pinion 61 which meshes with a gear 62. The gear 62 likewise is of molded plastic and has an integral pinion 63 in mesh with a molded gear 64. The gear 64 likewise comprises molded plastic and has an integral output pinion 65 and a reduced outer diameter portion 66. Thus all of the gears and pinions comprise plastic. Each of the gears 58, 60, and 62 is axially hollow and is supported on a pin 67 staked to the case element 22. The opposite ends of the pins 67 are slidably received in close fitting apertures in the case element 21. The gear 64 is slidably and rotatably supported on a pin 68, likewise staked to the case element 22, its other end terminating within the gear 64 which has a bearing portion 69a rotatably supported in the case element 21. To supplement this support of the gear 64, the outboard reduced portion 66 may be provided with bearing support in the device to be driven if desired.

The magnetic field members 23, 24 which serve as a case for the motor section 16, also provide the magnetic circuit portions of the stator of the motor section 16. The field member 23 is generally annular in configuration having a central opening through which the rotor 29 is inserted. At the inner periphery of the magnetic field member 23, there is a set of salient poles, each identified by the numeral 69. These extend in a direction parallel to the axis of rotation and are arranged in a circular configuration just radially outward of the rotor poles 47, 48. The field member 23 lies at one side of the coil assembly, and when alternating current is applied to the coil, a resulting magnetic field having instantaneous alternating polarities is induced in the field member 23 and thus conducted to the salient poles 69.

Similarly, the magnetic field member 24 is provided with a set of circularly arranged salient poles 70 which are appropriately circularly arranged and properly interfitted with the salient poles 69. In a similar manner, opposite instantaneous polarities of magnetic field are induced in the poles 70.

As best seen in FIGURE 2, the salient poles 69 and 70 are arranged in a pattern wherein one-half of the salient poles are shifted ninety electrical degrees or one-half pole space with respect to the other half of the salient poles, whereby good starting and operating torques are obtained.

In this embodiment, the stator employs two less poles than the rotor. Since the rotor employs an even total number of poles, the total number of stator poles is also even. In the preferred disclosed embodiment there thus are twenty-two rotor poles and twenty stator poles. The total number of stator poles is a multiple of four whereby the stator poles can be arranged, as they are here, in four separate divisions or groups. The arrangement of the stator poles is thus dependent upon the number of rotor poles. For purposes of describing the arrangement of poles, the angle α is employed and is defined as the angle obtained by dividing the total number of uniformly spaced poles into 360°. This angle is also referred to herein as the pole spacing, and electrically it represents 180°.

Considering the view of the stator shown in FIGURE 2, the upper right hand quadrant includes three stator poles 69 and two stator poles 70 mutually spaced from each other by the angle α, and being of alternate polarity. This group of poles is referred to herein as a pole division.

Diametrically opposite thereto, illustrated in the lower left-hand quadrant, there is a second division containing five poles, two being poles 69 and three being poles 70. These poles are likewise spaced from each other by the angle α.

In the lower right-hand quadrant there is a third division of poles, which like the first division described, contains three poles 69 and two poles 70, while diametrically opposite thereto in the upper left-hand quadrant there is a division containing three poles 70 and two poles 69.

Within each division, the angle between two similar poles is equal to twice α. However, attention is invited to the fact that the included angle between two similar poles 69 adjacent each other between the first and third described divisions is not twice α, but one and one-half times α. Diametrically opposite thereto, the angle between two poles 70 likewise is not twice α but is one and one-half times α. Considering the first and second described divisions as a reference, the third and fourth divisions can therefore be said to have been shifted clockwise by an angle equal to one-half α, or one-half pole spacing. This "shift" increases the angle between the pole 69 and the pole 70 between the first and fourth described divisions to one and one-half times α, and likewise increases the spacing between the diametrically opposite pair of stator poles to one and one-half times α. The rotor can be so disposed that half of its poles are simultaneously aligned with the poles of diametrically opposite divisions, while the poles of the other diametrically opposite divisions are then disposed in a position which is shifted one-half pole spacing or ninety electrical degrees from then being aligned.

In this embodiment, the individual rotor poles 47 and 48 are of uniform size, and similarly, the individual stator poles 69 and 70 are also of uniform size. With this novel pole arrangement, although the stator poles are arranged non-uniformly because of the arrangement in four separate divisions, the number of poles 69 is equal to the number of poles 70.

Figure 3:
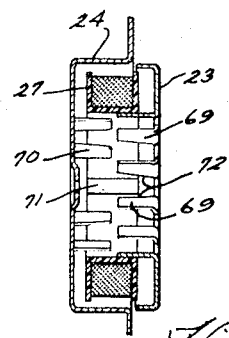
FIGURE 3 is a cross-sectional view showing assembly of certain elements in reduced scale.

It will be noted that between each of the adjacent pole divisions, there is a space within which no pole is provided. As best seen in FIGURES 2 and 3, the rigid plastic bobbin 27 is provided with four internally projecting splines 71, which project from the inner periphery thereof into these spaces between the adjacent pole divisions. The width of each of the splines 71 corresponds to the width of the space between the divisions whereby each spline abuts the adjacent salient poles. This structure serves to lock and to maintain the relative angular spacing between the set of poles 70 and the set of poles 69.

The splines 71 serve a further purpose as illustrated in FIGURE 3. During the assembly of the stator of the motor section 16, one of the field members 23 is placed on the coil assembly's bobbin 27 with adjacent salient poles 69 embracing one of the splines 71. This assembly locks the field member 23 angularly with respect to the bobbin 27. In like manner, the field member 24 is assembled to the bobbin 27 with a pair of its pole members 70 embracing the opposite spline 71 in a similar manner. This relationship locks the relative angular position between the field member 24 and the bobbin 27. The field members 23 and 24 are thereby provided with the proper relative angular spacing, after which the field members 23 and 24 are pressed together with the various poles 69 and 70 interfitting as described.

To further ease the assembly just described, it is preferable that an appropriate number of cam surfaces 72, shown in FIGURE 3, be provided for appropriate poles 69 and 70. The cam surfaces 72 ease the initial reception of the sets of poles into the bobbin cavity, and by joint co-action with the corresponding spline, effect relative angular rotation between the bobbin 27 and the field members 23 and 24. Thus the splines and cam surfaces co-act to shift the actual position of the field members into proper alignment and to hold them while they are being pressed together. Moreover, once the assembly has been completed, the splines 71 continue to act on the abutting pole elements to maintain the proper spacing between the sets of poles 69 and 70. Thus the field members 23 and 24 are complemental as to their pole structure, are complemental in that they jointly define the recess for the coil assembly, and are complemental in that they telescope together. It is emphasized that the splines 71 are the sole means which determine the relative angular relation between the field members 23 and 24 while they are being assembled.

The motor section 16 described is inherently capable of initiating rotation when energized an either direction of rotation. In a typical installation, rotation is desired solely in one direction. In order to insure that the motor section 16 will continue to run only in the desired or predetermined direction, means are provided for mechanically reversing the direction of rotor rotation only in the event that the motor should begin to rotate in the wrong direction. Such means are disclosed and claimed in the patent identified in the first paragraph.

By making the pinion 34 of soft energy-absorbent plastic, several advantages are obtained including: damping of axial rotor vibration, synchronization of reversing mechanism, and thrust bearing support with the separate thrust ring 57 omitted.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A motor assembly comprising in combination:
    (a) a motor section constructed as a unit and having a rotor;
    (b) a gear train section constructed as a second unit;
    (c) means normally securing said sections together, and
    (d) means providing a rotational driving connection between said rotor and said gear train section, said driving connection comprising a pair of complemental co-axial elements which are slidably separable from each other in response to separation of said sections in a direction parallel to the rotational axis of said rotor.

2. A motor assembly according to claim 1, which includes:
    (a) a first case enclosing said motor section; and
    (b) a second case enclosing said gear train section;
    (c) said securing means securing said cases together and comprising means for mounting the motor assembly.

3. A motor assembly comprising in combination:
    (a) a motor section constructed as a unit and having a rotor;
    (b) a gear train section constructed as a second unit;
    (c) a first case enclosing said motor section;
    (d) a second case including a pair of separate complemental co-acting case elements comprising the sole means enclosing only said gear train section;
    (e) means secured to said first case and to both of said complemental case elements for mounting the motor assembly and for normally holding said complemental elements together about said gear train section; and
    (f) means providing a driving connection between said rotor and said gear train section.

4. A motor assembly according to claim 2, in which said driving connection is slidably separable in response to separation of said cases.

5. A motor assembly according to claim 1, which includes a separate rotor pinion co-axial with the rotor and which pinion is integral with one of said complemental co-axial elements, and in which the other of said complemental co-axial elements is integral with said rotor.

6. A motor assembly according to claim 1, which includes a separate rotor pinion co-axial with the rotor, said complemental co-axial elements being respectively secured to said rotor and to said rotor pinion and jointly enabling angular lost motion therebetween.

7. A motor assembly according to claim 6, in which said rotor has a hub portion, one of said rotor hub portions and said rotor pinion having radially extending tongue means, the other of said rotor hub portion and said rotor pinion having means engageable with said tongue means and extending in a direction parallel to the rototional axis from a point radially offset therefrom, and disposed to be relatively rotatable to limit said angular lost motion by engagement between said pin and tongue means.

8. A motor assembly according to claim 1 which includes:
    (a) a separate rotor pinion co-axial with said rotor and respectively having said complemental co-axial elements;
    (b) case means enclosing said sections;
    (c) a pin directly supported by said case means and supporting said rotor and said pinion for rotation within said case means; and
    (d) a pair of soft energy-absorbent plastic thrust means each loosely encircling said pin and respectively disposed at the remote ends of said rotor and said rotor pinion adjacent to said case means in position to receive and oppose any axial thrust from said rotor.

9. A motor assembly comprising in combination:
    (a) a motor section having a rotor;
    (b) case means enclosing said motor section;
    (c) a pin directly supported by said case means and supporting said rotor for rotation within said case means; and
    (d) a soft energy-absorbent plastic thrust member loosely encircling said pin and disposed between and jointly engageable by one side of said rotor and said case means.

10. A motor assembly according to claim 9, in which said rotor has a hub constructed of a rigid plastic in direct engagement with said pin, said plastic thrust member being constructed of one of polyurethane and vinyl and floating on said pin.

11. A motor assembly according to claim 9, which includes a second soft energy-absorbent plastic thrust member loosely encircling said pin and disposed adjacent to said case means at the opposite side of said rotor.

12. A motor assembly according to claim 9, in which said rotor has a hub portion and a co-axial pinion driven by said hub portion, the remote ends of said hub portion and said pinion being enclosed by said case means, at least one of said hub portion and said pinion comprising rigid plastic engageable with said soft plastic thrust member.

13. A motor assembly according to claim 9, which includes a stator substantially enclosed by said case means and co-active with said rotor, said rotor including:
    (a) a hub having a flange comprising rigid non-magnetic material, said hub comprising said one side of said rotor;
    (b) a pair of pole plates secured on said hub adjacent to said flange and each having a series of peripheral pole elements interfitted with the pole elements of the other of said plates and presenting a permanently magnetic field toward said stator; and
    (c) rigid means integral with said flange for engaging and locking at least one of said pole plates against relative angular movement with respect to said hub.

14. A rotor assembly for an electric motor comprising in combination:
    (a) a hub having a flange comprising rigid non-magnetic material;
    (b) a pair of pole plates secured on said hub adjacent to said flange and each having a series of peripheral pole elements interfitted with the pole elements of the other of said plates, and presenting a permanently magnetic field; and (c) rigid means integral with said flange for engaging and locking at least one of said pole plates against relative angular movement with respect to said hub.

15. A rotor assembly according to claim 14, in which said pole plates are co-axial with the rotational axis, and are magnetic, and which includes:

(a) a permanent magnet between said pole plates providing said field; and (b) means retaining said plates and said magnet in assembled relation with said hub.

16. A rotor assembly according to claim 15, in which each of said pole plates has an odd number of said peripheral pole elements equally spaced and interfitted alternately, said rigid means having an equally spaced structural repetition equal in total number to said odd number and engageable with said pole elements.

17. A rotor assembly according to claim 15, in which said rigid means defines at least one peripheral notch receiving therein at least one of said pole elements of one of said plates.

18. A motor assembly comprising in combination:
(a) a stator having a set of stator poles;
(b) a rotor having a set of rotor poles;
(c) one of said sets of poles being uniformly angularly spaced about the rotational axis;
(d) one half of the poles of the other of said sets of poles having an angular spacing with respect to each other equal to that of said one set and simultaneously alignable therewith; and
(e) the other half of the poles of said other of said sets of poles having an angular spacing with respect to each other equal to said one half, and all of said other half being angularly offset therefrom in one direction by an angle equal to one half of a pole spacing.

19. A motor assembly according to claim 18,
(a) said one set of poles being uniformly sized, being permanently magnetic, and being on said rotor; and
(b) said other set of poles being uniformly sized, and being salient stator poles.

20. A motor assembly according to claim 18, said other set of poles being arranged in four divisions of equal number, the poles of one pair of opposite divisions being said one half of the poles of said other set, and the poles of the other pair of oposite divisions being said other half of the poles of said other set.

21. A motor assembly according to claim 18, successive poles of said one of said sets having alternate magnetic polarity.

22. A motor assembly according to claim 18, wherein the number of poles in said one set of poles is even and is not less than four, and wherein said other set has two poles less than said one set.

23. A motor assembly according to claim 19, in which said stator poles are arranged in four divisions of equal number, the poles of one pair of opposite divisions being said one half of the poles of said other set, and the poles of the other pair of opposite divisions being said other half of the poles of said other set, and in which successive rotor poles have alternate magnetic polarity, there being two more rotor poles than stator poles.

24. A motor assembly according to claim 18, in which said stator poles are arranged in four divisions of equal number on two magetic field members, the poles of one pair of opposite divisions being said one half of the poles of said other set, and the poles of the other pair of opposite divisions being said other half of the poles of said other set; said stator including a coil disposed on a rigid non-magnetic bobbin having rigid spline means projecting into spaces between end poles of adjacent divisions and holding said field members to preclude angular shifting therebetween.

25. A motor assembly comprising in combination:
(a) a rotor having peripheral magnetic poles; and
(b) a stator including
  (1) a pair magnetic field members respectively having interfitted circularly arranged salient poles jointly defining a cavity in which said rotor is disposed, and an annular recess encircling said poles,
  (2) a rigid non-magnetic bobbin having an annular winding disposed thereon and received within said annular recess, said bobbin having rigid spline means projecting from a periphery of said bobbin into spaces between pairs of said salient poles for engagement therewith and comprising the sole means on said stator determining the relative angular relation between said field members about the rotational axis of the rotor and hence the angular alignment between said salient poles and said rotor poles.

26. A motor assembly according to claim 25, at least one of said poles on each of said field members having a cam surface for being engaged by at least one of said splines for effecting the proper angular rotation and disposition of all of said salient poles about the rotational axis during assembly of said stator.

27. A motor assembly according to claim 26, in which said spline means comprises a pair of splines each engaged on one side by one of the salient poles of one of said members, and on the other side by one of the salient poles of the other of said members.

References Cited

UNITED STATES PATENTS

| | | | |
|---|---|---|---|
| 2,465,042 | 3/1949 | Schlenker | 310—83 |
| 2,467,870 | 4/1949 | Stephenson | 310—83 |
| 2,603,983 | 7/1952 | Rieser | 310—83 |
| 2,936,644 | 5/1960 | Miller | 310—83 |
| 3,109,950 | 11/1963 | Muller | 310—83 |
| 3,142,774 | 7/1964 | Lundin | 310—83 |
| 3,183,387 | 5/1965 | Wasynczuk | 310—83 |
| 3,187,209 | 6/1965 | Schmitter | 310—83 |
| 3,241,397 | 3/1966 | Wilkinson | 310—83 |
| 3,268,751 | 8/1966 | Nebiolo | 310—41 |
| 3,307,056 | 2/1967 | Woolley | 310—83 |

J. D. MILLER, *Primary Examiner.*

U.S. Cl. X.R.

310—66, 67, 134, 156, 158, 162, 263